United States Patent [19]

Itoh

[11] Patent Number: 5,014,194
[45] Date of Patent: May 7, 1991

[54] SYSTEM FOR REDUCING I/O CONTROLLER OVERHEAD BY USING A PERIPHERAL CONTROLLER FOR PRODUCING READ, WRITE, AND ADDRESS TRANSLATION REQUEST SIGNALS

[75] Inventor: Kouichi Itoh, Tokyo, Japan

[73] Assignee: NEC Corporation, Tokyo, Japan

[21] Appl. No.: 89,785

[22] Filed: Aug. 27, 1987

[30] Foreign Application Priority Data

Aug. 28, 1986 [JP] Japan .................. 61-200186

[51] Int. Cl.$^5$ .................. G06F 13/12; G06F 13/14; G06F 9/312; G06F 12/10
[52] U.S. Cl. .................. 364/200; 364/238.3; 364/240.2; 364/255.1; 364/260; 364/228.5; 364/961.2; 364/968; 364/935.46; 364/926.92; 364/927.98; 364/931.44; 364/964.1; 364/955
[58] Field of Search ... 364/200 MS File, 900 MS File

[56] References Cited

U.S. PATENT DOCUMENTS

| | | | |
|---|---|---|---|
| 3,976,977 | 8/1976 | Porter et al. | 340/172.5 |
| 4,106,092 | 8/1978 | Millers, II | 364/200 |
| 4,162,520 | 7/1979 | Cook et al. | 364/200 |
| 4,189,769 | 2/1980 | Cook et al. | 364/200 |
| 4,224,667 | 9/1980 | Lewis et al. | 364/200 |
| 4,231,088 | 10/1980 | Hammer et al. | 364/200 |
| 4,320,456 | 3/1982 | Heise et al. | 364/200 |
| 4,395,757 | 7/1983 | Bienvenu et al. | 364/200 |
| 4,564,899 | 1/1986 | Holly et al. | 364/200 |
| 4,688,166 | 8/1987 | Schneider | 364/200 |
| 4,774,659 | 9/1988 | Smith et al. | 364/200 |

Primary Examiner—Archie F. Williams, Jr.
Assistant Examiner—Eric Coleman
Attorney, Agent, or Firm—Foley & Lardner, Schwartz, Jeffery, Schwaab, Mack, Blumenthal & Evans

[57] ABSTRACT

In a data processing system which is for use in combination with at least one peripheral device and comprises an input-output processor connected to a first and a second bus, a main memory connected to the first bus, a peripheral controller connected to the second bus and the peripheral device, and a central processor connected to the first bus and coupled to the second bus through the input-output processor, the peripheral controller requests data transfer between the main memory and the peripheral device. For this purpose, the peripheral controller produces a translation request signal in response to a channel command which is stored in a local memory of the peripheral controller from the main memory through the input-output processor and indicates the data transfer. Receiving the translation request signal through the input-output processor, the central processor translates into a physical data address a logical data address which accompanies the channel command and is stored in the local memory from the main memory. On transferring data from the main memory to the peripheral device, the peripheral controller produces a read command signal in response to the physical data address received through the input-output processor. In a similar manner, the peripheral controller produces a write command signal on transferring data from the peripheral device to the main memory.

3 Claims, 4 Drawing Sheets

SYSTEM FOR REDUCING I/O CONTROLLER OVERHEAD BY USING A PERIPHERAL CONTROLLER FOR PRODUCING READ, WRITE, AND ADDRESS TRANSLATION REQUEST SIGNALS

BACKGROUND OF THE INVENTION

This invention relates to a data processing system.

In the manner which will later be described, the data processing system comprises a main memory comprising a program area and a data area. The program area is for memorizing a channel program including bits representative of a channel command and of a logical data address. The data processing system is for use in combination with at least one peripheral device, which may be a disk memory, a magnetic tape memory, or a display device.

In a conventional data processing system, an input-output processor responds to the bits representative of the channel command received from the program area. In this event, the input-output processor requests data transfer between the data area of the main memory and a peripheral controller coupled to the input-output processor and to the peripheral device when the data transfer is indicated by the channel command represented by the bits received from the program area. For this purpose, the input-output processor produces a translation request signal in response to the channel command which indicates the data transfer. Responsive to the translation request signal, a central processor translates into a physical data address the logical data address which accompanies the channel command and is represented by the bits received from the program area. On transferring data from the data area of the main memory to the peripheral device through the input-output processor and the peripheral controller, the input-output processor produces a read command signal in response to the physical data address which is represented by a signal received from the central processor. In a similar manner, the input-output processor produces a write command signal for use in transferring data from the peripheral device to the data area.

Inasmuch as the input-output processor requests the data transfer, the input-output processor must administrate the logical data address and also the physical data address into which the logical data address is translated. When the number of the peripheral controllers is increased in order to deal with a large number of peripheral devices, the input-output processor is subjected to overhead. Thus, the data processing system is incapable of efficiently controlling a large number of peripheral devices.

Such a conventional data processing system is disclosed, for example, in U.S. Pat. No. 4,224,667 issued to David O. Lewis et al and assigned to International Business Machines Corporation in Armonk, N.Y.. In the Lewis et al U.S. patent, the peripheral controller, the peripheral device, and the central processor are called an I/O adapter, an I/O device, and a central processing unit (CPU), respectively. The input-output processor may correspond to a combination of an I/O channel and a virtual address translator (VAT). Although an input-output (I/O) command including device address data and command data is transferred from a main storage or memory to the I/O adapter, the I/O adapter does not receive the above-mentioned channel command which indicates the data transfer and is accompanied by the logical data address.

SUMMARY OF THE INVENTION

It is therefore an object of this invention to provide a data processing system which is capable of reducing the overhead of an input-output processor on execution of data transfer.

It is another object of this invention to provide a data processing system of the type described, which is capable of efficiently controlling a large number of peripheral devices.

It is still another object of this invention to provide a data processing system which comprises a peripheral controller capable of requesting data transfer.

Other objects of this invention will become clear as the description proceeds.

According to this invention, there is provided a data processing system comprising: (1) a first and a second bus; (2) an input-ouput processor connected to the first and the second buses; (3) a main memory comprising a program and a data area which are connected to the first bus, the program area being for storing a channel program including bits representative of a channel command and of a logical data address; (4) a peripheral controller comprising a memory connected to the second bus and a translation request signal producing unit connected to the second bus and to the memory; the memory being for memorizing the bits which are representative of the channel command and of the logical data address and are received from the program area through the first bus, the input-output processor, and the second bus with the channel command and the logical data address stored as a stored command and a stored data address, the memory being furthermore for delivering a signal representative of the stored data address to the second bus; the translation request signal producing unit being for producing a translation request signal and for delivering the translation request signal to the second bus when supplied from the memory with a signal representative of the memorized command and moreover when data transfer is indicated by the stored command; and (5) a central processor which comprises a translating unit connected to the first bus and coupled to the second bus through the input-output processor, the translating unit being for translating the stored data address to a physical data address and for delivering a signal representative of the physical data address to the first bus in response to the translation request signal and the signal representative of the stored data address which are received from the second bus under control of the input-output processor. The data transfer is carried out between the physical data address of the data area and the peripheral controller through the input-output processor and the first and the second buses in response to the signal which is representative of the physical data address and is delivered to the first bus.

DESCRIPTION OF THE PREFERRED EMBODIMENT

Figure 1:
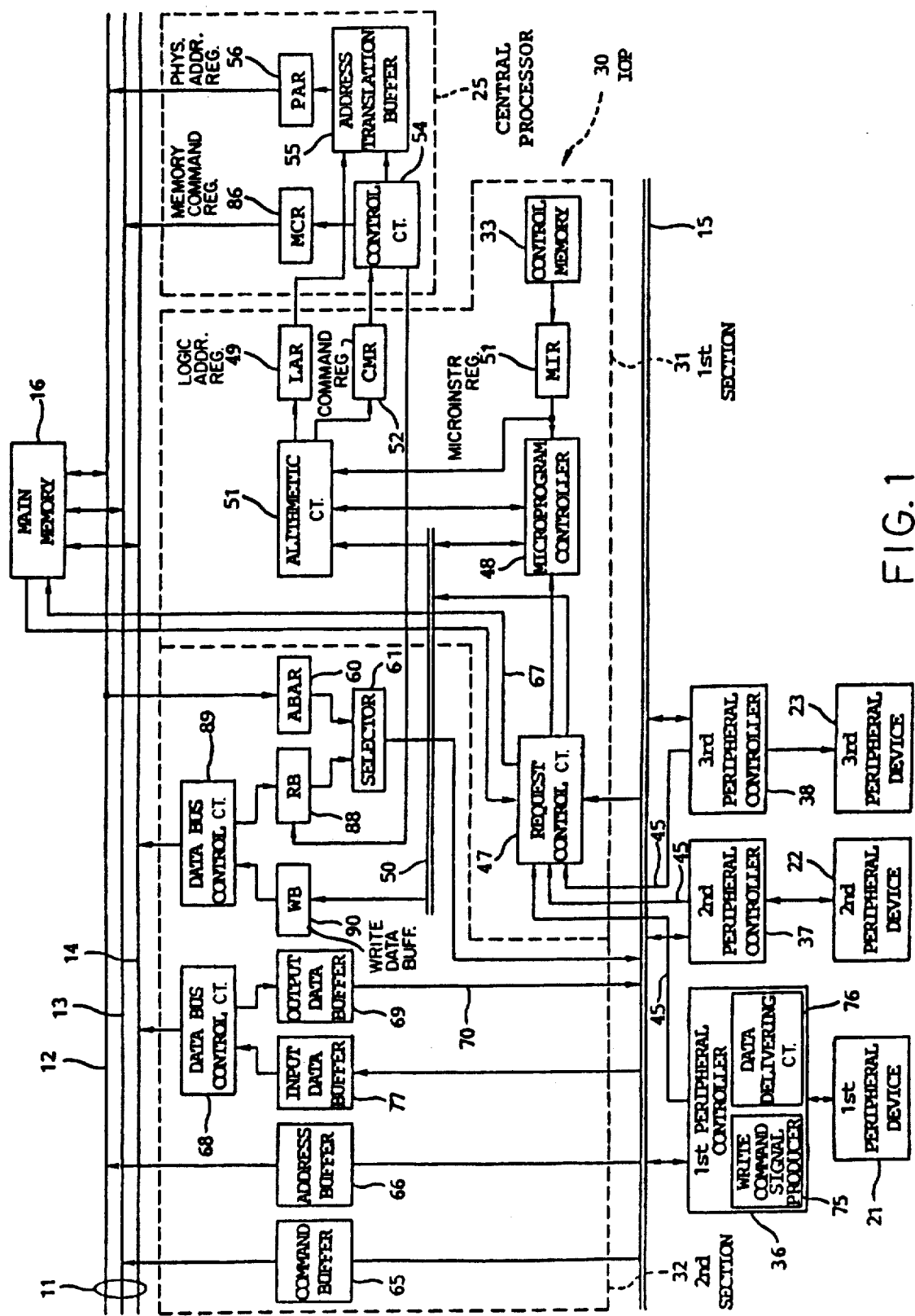
FIG. 1 is a block diagram of a data processing system according to a preferred embodiment of this invention.

Referring to FIG. 1, a data processing system according to a preferred embodiment of this invention comprises a first bus 11 which comprises an address bus 12, a command bus 13, and a data bus 14 and is therefore operable as a memory bus. On the other hand, a second bus 15 is operable as an input/output bus. A main memory 16 is connected to the address, the command, and the data buses 12, 13, and 14.

Figure 2:
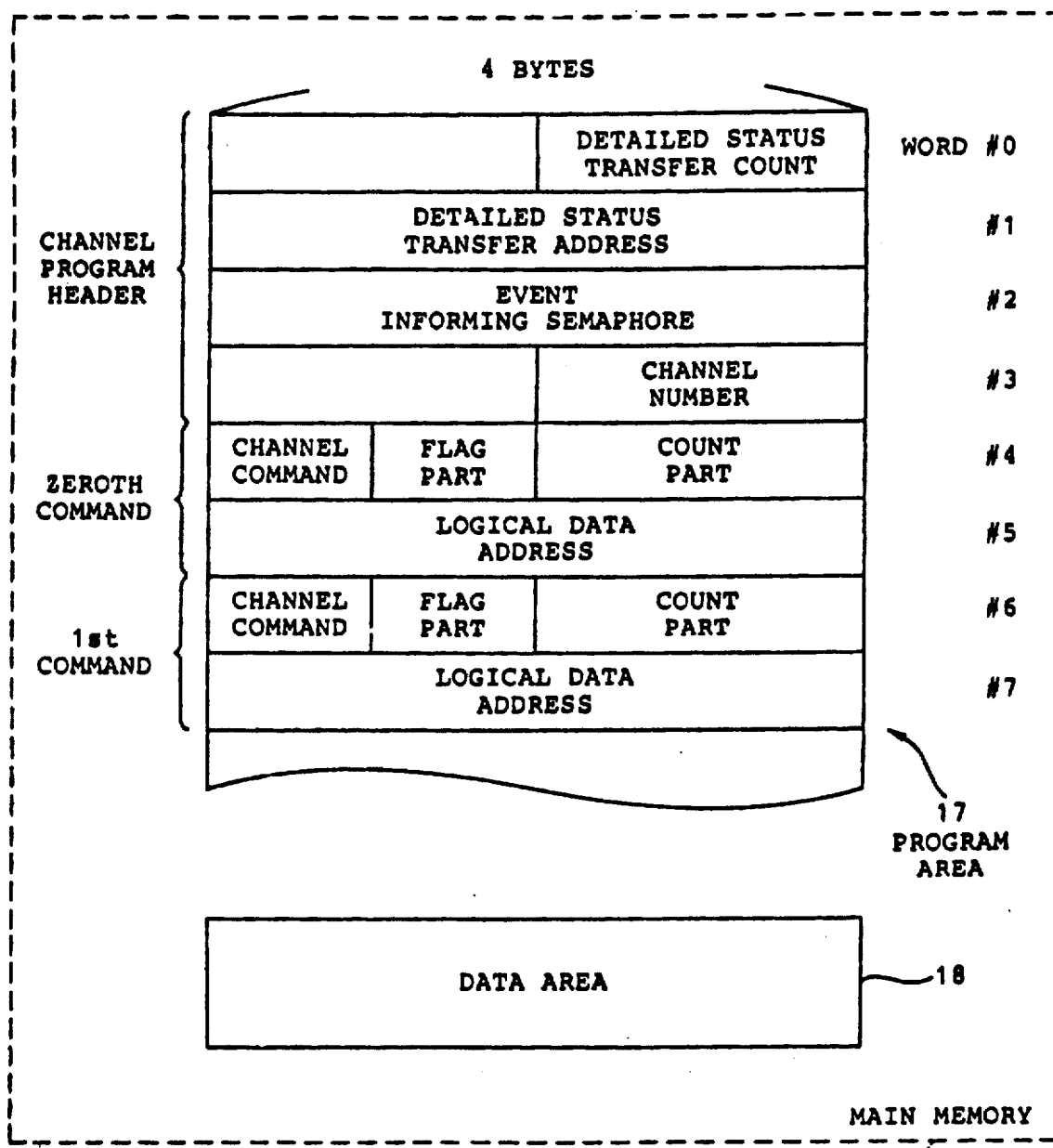
FIG. 2 is a diagram for use in describing operation of a main memory which is for use in the data processing system illustrated in FIG. 1.

Referring to FIG. 2 together with FIG. 1, the main memory 16 comprises a program area 17 and a data area 18 which are connected to the first bus 11. The program area 17 is for storing a channel program.

The channel program is representative of a procedure for an input or output operation for one of first, second, and third peripheral devices 21, 22, and 23. In the example being illustrated in FIG. 1, the first, the second, and the third peripheral devices 21, 22, and 23 are a magnetic disk unit, a magnetic type unit, and a display unit, respectively.

The channel program includes a channel program header of zeroth through third words #0 to #3, a zeroth command of fourth and fifth words #4 and #5, and a first command of sixth and seventh words #6 and #7. In the example being illustrated in FIG. 2, one word is four bytes long.

The channel program header is for use in controlling the zeroth, the first, and like commands. For example, the channel program header is for use in storing detailed status information received from one of the peripheral devices 21 to 23 when necessity arises to obtain the detailed status information. In the detailed status information, a detailed status transfer count represents a data length. A detailed status transfer address represents an address where the detailed status information should be stored. In the channel program header, an event informing semaphore is for informing the software of an end of the input or output operation. A channel number is for use in specifying a path for one of the peripheral devices 21 to 23. The channel program header has no direct concern with this invention.

Each command includes bits representative of a channel command and of a logical data address. In the example being illustrated, each channel command is one byte long while each logical data address is four bytes long. When data transfer between the main memory 16 and one of the peripheral devices 21 to 23 is indicated by the channel command, the data transfer must be carried out between one of the peripheral devices and a physical data address of the data area 18 corresponding to the logical data address which accompanies the channel command under consideration. A flag part is one byte long and is for use in memorizing various flags, such as a command chain flag, for each channel command. When the flag part of the zeroth command is of logic "1" value to represent the command chain flag, operation continues to the next succeeding command, that is, the first command. A count part is two bytes long and is for use in specifying the amount of data which should be transferred between the physical data address of the data area 18 and one of the peripheral devices 21 to 23.

Referring to FIG. 1 again, a central processor 25 is generally called a central processing unit (CPU) and is connected to the first bus 11. Operation of the central processor 25 will become clear as the description proceeds.

An input-output processor 30 is labeled "IOP." The input-output processor 30 is connected to the first and the second buses 11 and 15 and is coupled to the central processor 25 in the manner which will become clear as the description proceeds. The input-output processor 30 comprises first and second sections 31 and 32. The first section 31 is controlled by a control microprogram stored in a control memory 33 and is therefore referred to also as a microprocessor section. The second section 32 acts as an information transfer section for transferring the zeroth and the first commands (FIG. 2) and data between the first and the second buses 11 and 12 in asynchronism with the first or microprocessor section 31. Operation of the input-output processor 30 will become clear as the description proceeds.

First, second, and third peripheral controllers 36, 37, and 38 are connected between the second bus 15 and the first, the second, and the third peripheral devices 21, 22, and 23. Operation of the peripheral controllers 36, 37, and 38 will become clear as the description proceeds.

Figure 3A:
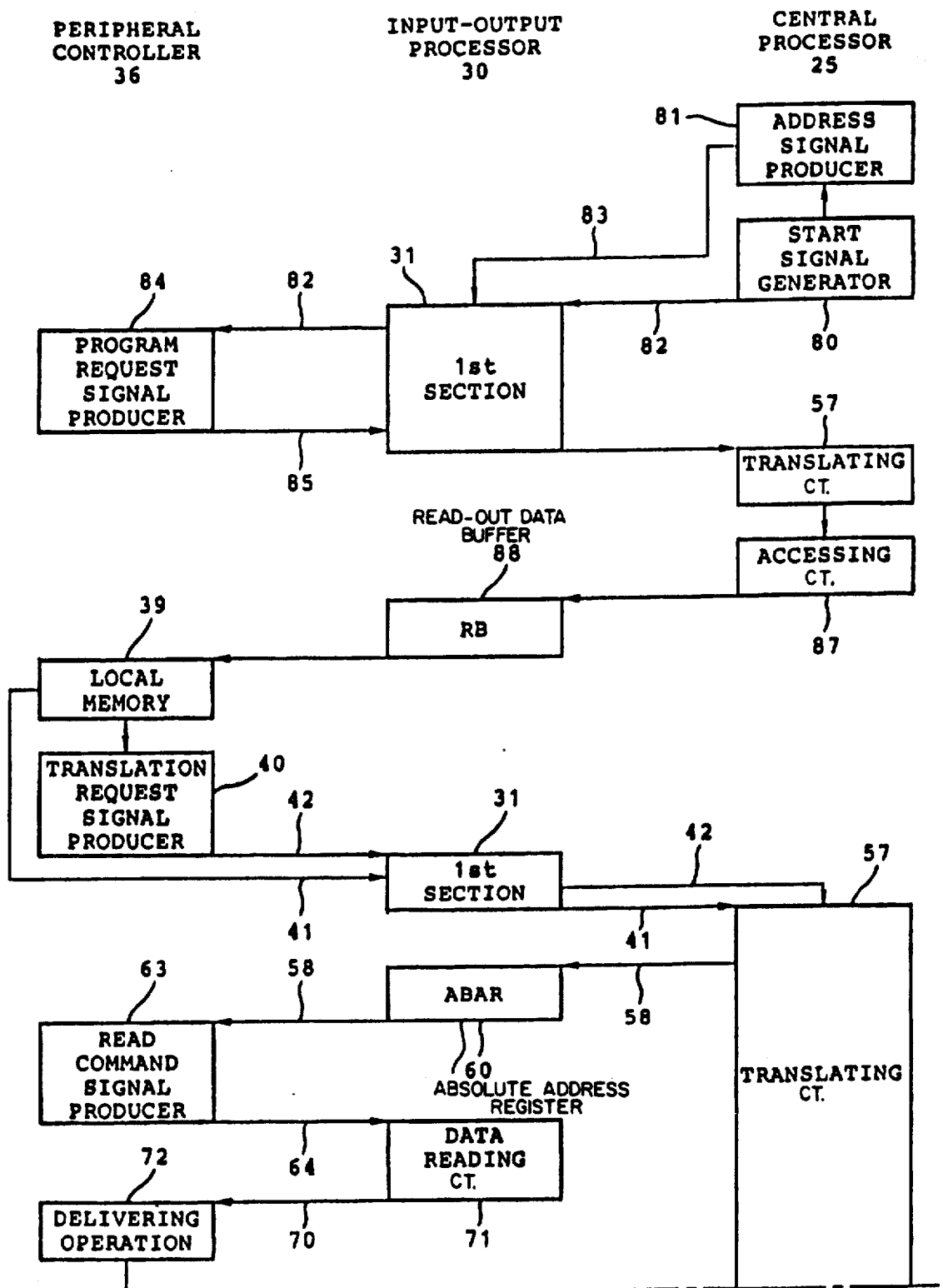
FIGS. 3(a) and (b), when combined together, show a diagram for use in describing operation of the data processing system illustrated in FIG. 1.

Referring to FIG. 3(a) together with FIG. 1, a description will be provided with regard to the translation operation for translating the logical data address of the zeroth command (FIG. 2) into the physical data address.

It will be assumed that the zeroth command (FIG. 2) is already transferred from the program area 17 (FIG. 2) to an objective one 36 of the first through the third peripheral controllers 36 to 38 in the manner which will later be described.

The first peripheral controller 36 comprises a local memory 39 connected to the second bus 15 and a translation request signal producer 40 connected to the second bus 15 and to the local memory 39.

The local memory 39 is for memorizing the bits which are representative of the channel command and of the logical data address and are received from the zeroth command of the program area 17 (FIG. 2) through the first bus 11, the input-output processor 30, and the second bus 15. For convenience of the description which follows, the channel command and the logical data address stored in the local memory 39 will be called a stored command and a stored data address. The local memory 39 furthermore delivers a signal 41 representative of the stored data address to the second bus 15.

The translation request signal producer 40 is for producing a translation request signal 42 and for delivering the translation request signal 42 to the second bus 15 as a service code signal when supplied from the local memory 39 with a signal representative of the stored command and moreover when data transfer is indicated by the stored command.

On delivering the translation request signal 42 and the signal 41 representative of the stored data address to the second bus 15, the first peripheral controller 36 delivers also a demand signal to the first section 31 of the input-output processor 30 through a control signal line 45. The first section 31 comprises a request control circuit 47 responsive to the demand signal for judging priority of the demand signal. When the demand signal from the first peripheral controller 36 has the highest priority among demand signals which may be substantially simultaneously sent from at least another of the peripheral controllers 37 and 38, the request control circuit 47 deals with the translation request signal received from the second bus 15 and decodes the translation request signal into an interrupt request signal.

Responsive to the interrupt request signal, a microprogram controller 48 controls transfer of the signal 41 representative of the stored data address from the second bus 15 to a logical address register 49 labeled "LAR" through the request control circuit 47, an internal data bus 50, and an arithmetic circuit 51. The microprogram controller 48 moreover controls transfer of the translation request signal from the request control circuit 47 to a command register 52 labeled "CMR" through the internal data bus 50 and the arithmetic circuit 51. In this manner, the command register 52 stores a command representative of address translation of a logical address into a physical address. The logical address is, for example, the logical data address. The physical address will presently be exemplified. Reference numeral 51' represents a microinstruction register labeled "MIR" for storing a microinstruction received from the control memory 33 to control the microprogram controller 48 and the arithmetic circuit 51.

The central processor 25 comprises a control circuit 54 which is responsive to the command (that is, the translation request signal 42) received from the command register 52 for controlling an address translation buffer 55. The address translation buffer 55 translates the stored data address received from the logical address register 49 to a physical data address under control of the control circuit 54 and delivers a signal representative of the physical data address to the address bus 12 of the first bus 11 through a physical address register 56 labeled "PAR".

Thus, the combination of the address translation buffer 55 and the physical address register 56 operates a translating circuit 57 is illustrated in FIG. 3. The translating circuit 57 is connected to the first bus 11 and is coupled to the second bus 15 through the input-output processor 30 and is for translating the stored data address to the physical data address and for delivering the signal (depicted in FIG. 3(a) at 58) representative of the physical data address to the first bus 11 in response to the translation request signal 42 and the signal 41 representative of the stored data address which are received from the second bus 15 under control of the input-output processor 30.

When the signal 58 representative of the physical data address is delivered to the address bus 12, an absolute address register 60 labeled "ABAR" of the second section 32 of the input-output processor 30 takes in the signal 58 representative of the physical data address in accordance with a take-in indication signal (not shown) received from the central processor 25. The signal 58 representative of the physical data address is transferred from the absolute address register 60 to the first peripheral controller 36 through a selector 61 and the second bus 15. As a result, address translation request operation comes to an end for the logical data address of the zeroth command illustrated in FIG. 2.

The data transfer is carried out between the physical data address of the data area 18 (FIG. 2) and the first peripheral controller 36 through the input-output processor 30 and the first and the second buses 11 and 15 in response to the signal 58 which is representative of the physical data address and is delivered from the first bus 11 to the first peripheral controller 36 through the input-output processor 30. Operation of the data transfer will now be described in more detail.

Continuously referring to FIGS. 1 and 3(a), description will be made at first as regards a first case where data is transferred from the data area 18 (FIG. 2) of the main memory 16 to the first peripheral controller 36 and thence to the peripheral device 21. The first peripheral controller 36 comprises a read command signal producer 63 connected to the second bus 15 and to the local memory 39. The read command signal producer 63 is for producing a read command signal 64 and for delivering the read command signal 64 to the second bus 15 in response to the signal 58 which is representative of the physical data address and is received from the first bus 11 through the input-output processor 30 and the second bus 15. The read command signal 64 indicates read operation. Simultaneously, the first peripheral controller 36 supplies the request control circuit 47 of the first section 31 of the input-output processor 30 with a read request signal through the control signal line 45 and also supplies to the second bus 15 with the signal 58 which is representative of the physical data address and is received from the first bus 11 through the input-output processor 30 and the second bus 15. The read command signal 64 and the signal 58 representative of the physical data address are stored in a command buffer 65 and an address buffer 66 of the second section 32 of the input-output processor 30.

Responsive to the read request signal, the request control circuit 47 controls the command and the address buffers 65 and 66 though connections not shown. Being so controlled, the buffers 65 and 66 deliver the read command signal 64 and the signal 58 representative of the physical data address to the command bus 13 and the address bus 12, respectively. Simultaneously, the request control circuit 47 produces an enable signal 67 in response to the read request signal. Responsive to the enable signal 67, the read command signal received from the command bus 13, and the signal 58 representative of the physical data address received from the address bus 12, the main memory 16 delivers data 70 from the physical data address of the data area 18 (FIG. 2) to the data bus 14. Data 70 is delivered from the data bus 14 to the second bus 15 through a data bus control circuit 68 and an output data buffer 69.

Thus, the combination of the command buffer 65, the address buffer 66, the request control circuit 47, the data bus control circuit 68, and the output data buffer 69 is operable as a data reading circuit 71 connected to the first and the second buses 11 and 15 and to the data area 18 (FIG. 2). The data reading circuit 71 is supplied with the read command signal 64 from the second bus 15 and is for reading data from the physical data address of the data area 18 (FIG. 2) through the first bus 11 and for delivering data 70 to the second bus 15.

The first peripheral controller 36 is operable in response to data received from the second bus 15. That is, the first peripheral controller 36 carries out delivering operation 72 for data received from the second bus 15 to the first peripheral device 21 in a manner known in the art.

Referring to FIG. 1, the description will proceed as regards a second case where data is transferred from the first peripheral device 21 to data area 18 (FIG. 2) of the main memory 16. The first peripheral controller 36 comprises a write command signal producer 75 connected to the second bus 15 and to the local memory 39 and a data delivering circuit 76 connected to the first peripheral device 21.

The write command signal producer 75 is for producing a write command signal and for delivering the write command signal to the second bus 15 in response to the signal 58 which is representative of the physical data address and is received from the first bus 11 through the input-output processor 30 and the second bus 15. The write command signal indicates a write operation. Simultaneously, the first peripheral controller 36 supplies the request control circuit 47 with a write request signal through the control signal line 45 and supplies the second bus 15 with the signal 58 (FIG. 3(a)) which is representative of the physical data address and is received from the first bus 11 through the input-output processor 30 and the second bus 15. The data delivering circuit 76 is for delivering data from the first peripheral device 21 to the second bus 15 in a known manner.

The write command signal and the signal 58 representative of the physical data address are stored in the command buffer 65 and the address buffer 66, respectively. Data delivered from the first peripheral device 21 is stored in an input data buffer 77.

Responsive to the write request signal, the request control circuit 47 controls the command and the address buffers 65 and 66 so that the buffers 65 and 66 deliver the write command signal and the signal 58 representative of the physical data address to the command bus 13 and the address bus 12, respectively. Simultaneously, the input data buffer 77 supplies the data bus 14 through the data bus control circuit 68 with data delivered from the first peripheral device 21 through the data delivering circuit 76 of the first peripheral controller 36 and then the second bus 15. The request control circuit 47 produces the enable signal 67 in response to the write request signal. Responsive to the enable signal 67, the write command signal received from the command bus 13, and the signal 58 representative of the physical data address received from the address bus 12, the main memory 16 stores data received from the data bus 14 in the physical data address of the data area 18 (FIG. 2).

Thus, the combination of the input data buffer 77, the data bus control circuit 68, and the command buffer 65 is operable as a data and signal delivering circuit connected to the first and the second buses 11 and 15 and responsive to the write command signal received from the second bus 15 for delivering to the first bus 11 data and the write command signal which are received from the second bus 15. Data delivered to the first bus 11 is written in the physical data address of the data area 18 (FIG. 2) in response to the write command signal delivered to the first bus 11.

Referring to FIG. 3(a) together with FIG. 1, a description will be made as regards transferring operation of the zeroth command (FIG. 2) from the program area 17 (FIG. 2) to the first peripheral controller 36.

For this purpose, the central processor 25 is preliminarily used to write the channel program in the program area 17 of the main memory 16 with bits representative of the zeroth and the first commands written at a zeroth and a first physical program address. The central processor 25 comprises a start signal generator 80 (FIG. 3(a)) coupled to the second bus 15 through the input-output processor 30 and an address signal producer 81 coupled to the start signal generator 80.

The start signal generator 80 is for generating a start signal (that is, a connect instruction signal) 82 and for delivering the start signal 82 to the input-output processor 30 to make the input-output processor produce the start signal 82 on the second bus 15. The start signal 82 is for use in instructing the start of input/or output operation for the first peripheral device 21.

Responsive to the start signal 82, the address signal producer 81 produces an address signal 83 representative of a logical program address corresponding to the (zeroth) physical program address at which the program area 17 (FIG. 2) stores the zeroth channel of the channel program. That is, the address signal 83 is representative of the logical program address for the fourth word #4 (FIG. 2).

In a manner which will become clear as the description proceeds, a queue is formed in the first section 31 of the input-output processor 30. An input and/or output request of the start signal 82 is entered into the queue. The first section 31 supplies the first peripheral controller 36 through the second bus 15 with an announcement of the presence of the input and/or output request which waits for execution. Subsequently, the first section 31 delivers the start signal 82 to the first peripheral controller 36 through the second bus 15.

The first peripheral controller 36 comprises a program request signal producer 84 (FIG. 3) connected to the second bus 15. The program request signal producer 84 is responsive to the start signal 82 received from the input-output processor 30 through the second bus 15 for producing a program request signal 85 and for delivering the program request signal 85 to the second bus 15 as the service code signal. The program request signal 85 is for use in requesting read-out of the zeroth command.

On delivering the program request signal 85 to the second bus 15, the first peripheral controller 36 delivers another demand signal to the first section 31 of the input-output processor 30 through the control signal line 45. Responsive to the demand signal, the request control circuit 47 judges priority of the demand signal among like demand signals. When the demand signal received from the first peripheral controller 36 has the highest priority, the request control circuit 47 takes in the program request signal 85 from the second bus 15 and decodes the program request signal 85 into the interrupt request signal like the translation request signal mentioned above.

Responsive to the interrupt request signal and the address signal 83 received from the address signal producer 81 of the central processor 25, the microprogram controller 48 delivers the address signal 83 to the logical address register 49 through the arithmetic circuit 51 to make the logical address register 49 store the address signal 83. As mentioned above, the address signal 83 represents the logical program address for the fourth word #4 (FIG. 2). Thus, the logical address register 49 serves as a register coupled to the address signal producer 81 for storing the address signal 83.

The microprogram controller 48 is used to transfer the program request signal from the request control circuit 47 to the command register 52 through the internal data bus 50 and the arithmetic circuit 51. More specifically, the command register 52 stores another command representative of not only the address translation of the logical address into the physical address but also memory access for the main memory 16.

Responsive to the other command (that is, the program request signal) received from the command register 52, the control circuit 54 of the central processor 25 controls the address translation buffer 55. The address translation buffer 55 translates the logical program address received from the logical address register 49 to the physical program address under control of the control circuit 54 and delivers a signal representative of the physical program address to the address bus 12 of the first bus 11 through the physical address register 56.

Thus, the translating circuit 57 comprising the address translation buffer 55 and the physical address register 56 is furthermore coupled to the logical address register 49 and is responsive to the program request signal received from the second bus 15 and to the address signal stored in the register 49 for translating the logical program address to the physical program address and for delivering the signal representative of the physical program address to the first bus 11.

The control circuit 54 also processes the other command into a memory read-out command which is representative of memory read-out and is suitable for the first bus 11. The memory read-out command is stored in a memory command register 86 labeled "MCR" and is delivered to the command bus 13 of the first bus 11.

When the memory read-out command and the signal representative of the physical program address of the zeroth command (FIG. 2) are delivered to the command bus 13 and the address bus 12, the zeroth command is read out of the main memory 16 and is delivered to the data bus 14.

Thus, an accessing circuit 87 illustrated in FIG. 3(a) comprises the control circuit 54 and the memory command register 86 and is for accessing the physical program address of the program area 17 (FIG. 2) to deliver the bits representative of the zeroth command to the first bus 11.

When a first word (the fourth word #4 in FIG. 2) of the zeroth command is delivered to the data bus 14 of the first bus 11, a read-out data buffer 88 labeled "RB" of the second section 32 takes in the first word of the zeroth command through a data bus control circuit 89 in accordance with a take-in indication signal received from the control circuit 54 of the central processor 25. As a result, read-out operation comes to an end for the first word of the zeroth command.

When the first word of the zeroth command is stored in the read-out data buffer 88, the microprogram controller 48 of the first section 31 of the input-output processor 30 makes the arithmetic circuit 51 add four to the content of the logical address register 49 with the selector 61 inhibiting delivery of the first word of the zeroth command to the second bus 15. With addition of four to the content, the logical address register 49 holds the logical program address which corresponds to a physical program address of the second word (the fifth word #5 in FIG. 2) of the zeroth command.

In accordance with a new logical address stored in the logical address register 49, the second word of the zeroth command is read out of the program area 17 and is stored in the read-out data buffer 88 like the first word of the zeroth command.

When both of the first and the second words of the zeroth command are stored in the read-out data buffer 88, the selector 61 delivers the first and the second words of the zeroth command to the first peripheral controller 36 through the second bus 15.

Thus, the combination of the read-out buffer 88 and the selector 62 serves as a program transferring circuit connected to the first and the second buses 11 and 15 for transferring to the second bus 15 the bits which are representative of the channel command and of the logical data address and are received from the first bus 11.

As mentioned above, the operation comes to an end for transfer of the zeroth command from the program area 17 to the first peripheral controller 36.

The second section 32 of the input-output processor 30 comprises a write data buffer 90 labeled "WB" connected between the internal data bus 50 and the data bus control circuit 89. The write data buffer 90 has no direct concern with this invention.

Figure 3B:
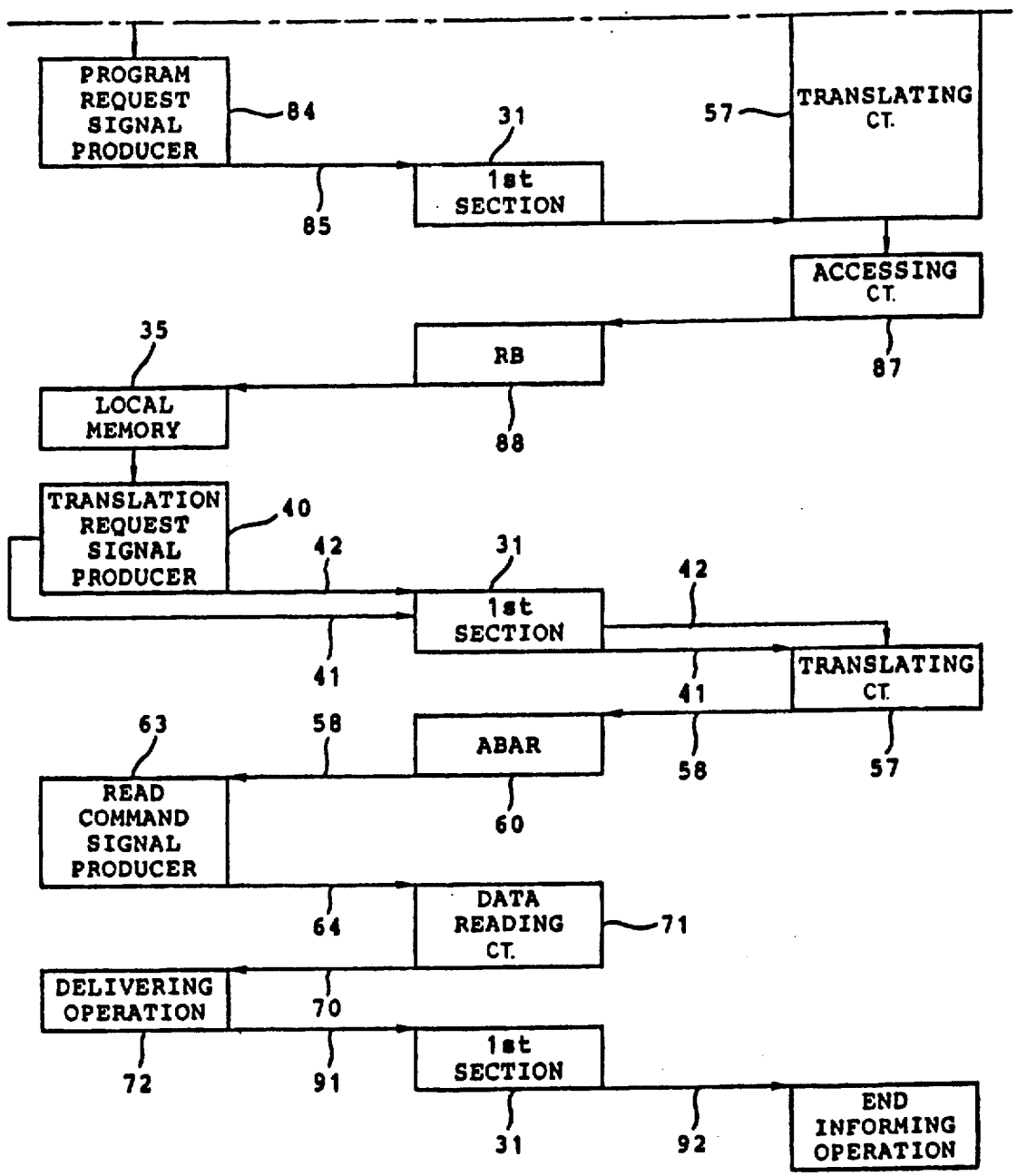

In the manner depicted in upper half (FIG. 3(a)) of FIG. 3 and described above, the first peripheral controller 36 controls first data transfer in accordance with the zeroth command stored in the local memory 39. When the first data transfer comes to an end, the first command is transferred from the first physical program address of the program area 17 to the first peripheral controller 36 as depicted in the lower half (FIG. 3(b)) of FIG. 3. In accordance with the first command, second data transfer is carried out between the first controller 36 and the main memory 16.

When execution of the channel program comes to an end, the first peripheral controller 36 supplies the first section 31 of the input-output processor 39 through the second bus 15 with a combination 91 of an end signal representative of an end of the input-output operation and a predetermined service code signal as illustrated in FIG. 3(b). Responsive to the predetermined service code signal, the first section 31 produces a message signal 92 for use in informing the software of the end of the input-output operation and writes the message signal in the main memory 16. Subsequently, the first section 31 requests the central processor 25 to inform the software of the end of the input-output.

In FIG. 1, each of the second and the third peripheral controllers 37 and 38 has a structure similar to that of the first peripheral controller 36 described above.

As described above, the data processing system illustrated in FIG. 1 is capable of reducing the overhead of the input-output processor 30 on execution of data transfer because each of the first, the second, the third peripheral controllers 36, 37, and 38 administrates the logical data address and also the physical data address into which the logical data address is translated. It is therefore possible to reduce the overhead of the input-output processor 30 even though the number of peripheral controllers is increased in order to deal with a large number of peripheral devices. Thus, the data processing system is capable of efficiently controlling a large number of peripheral devices.

What is claimed is:

1. A data processing system comprising:
 a first and a second bus;
 an input-output processor connected to said first and said second buses;
 a main memory comprising a program area and a data area, said program and said data areas being connected to said first bus, said program area storing a channel program including command and address bits representative of a channel command and of a logical data address;
 a peripheral controller comprising memory means connected to said second bus and translation request signal producing means connected to said second bus and to said memory means;
 said memory means storing said command and address bits which are received from said program area through said first bus, said input-output processor, and said second bus with said channel command and said logical data address stored as a stored command and a stored data address, said memory means being furthermore for delivering stored data address signals representative of said stored data address to said second bus;

said translation request signal producing means being for producing a translation request signal and for delivering said translation request signal to said second bus when supplied from said memory means with a stored command signal representative of said stored command and moreover when data transfer is indicated by said stored command; and a central processor which comprises translating means connected to said first bus and coupled to said second bus through said input-output processor, said translating means being for translating said stored data address to a physical data address and for delivering a physical data address signal representative of said physical data address to said first bus in response to said translation request and said stored data address signals which are received from said second bus under control of said input-output processor;

said data transfer being carried out between the physical data address of said data area and said peripheral controller through said input-output processor and said first and said second buses in response to said physical data address signal which is delivered to said first bus;

said peripheral controller further comprising read command signal producing means connected to said second bus and to said memory means, said read command signal producing means being for producing a read command signal and for delivering said read command signal to said second bus in response to said physical data address signal which is received from said first bus through said input-output processor and said second bus;

said input-output processor comprising data reading means connected to said first and said second buses and to said data area, said data reading means being responsive to said read command signal received from said second bus for reading data from the physical data address of said data area through said first bus and for delivering said data to said second bus; and said peripheral controller operating in response to data received from said second bus.

2. A data processing system comprising:

a first and a second bus;

an input-output processor connected to said first and said second buses;

a main memory comprising a program area and a data area, said program and said data areas being connected to said first bus, said program area storing a channel program including command and address bits representative of a channel command and of a logical data address;

a peripheral controller comprising memory means connected to said second bus and translation request signal producing means connected to said second bus and to said memory means;

said memory means storing said command and address bits which are received from said program area through said first bus, said input-output processor, and said second bus with said channel command and said logical data address stored as a stored command and a stored data address, said memory means being furthermore for delivering stored data address signals representative of said stored data address to said second bus;

said translation request signal producing means being for producing a translation request signal and for delivering said translation request signal to said second bus when supplied from said memory means with a stored command signal representative of said stored command and moreover when data transfer is indicated by said stored command; and a central processor which comprises translating means connected to said first bus and coupled to said second bus through said input-output processor, said translating means being for translating said stored data address to a physical data address and for delivering a physical data address signal representative of said physical data address to said first bus in response to said translation request and said stored data address signals which are received from said second bus under control of said input-output processor;

said data transfer being carried out between the physical data address of said data area and said peripheral controller through said input-output processor and said first and said second buses in response to said physical data address signal which is delivered to said first bus;

said peripheral controller being connected to a peripheral device and said peripheral controller further comprising write command signal producing means connected to said second bus and data delivering means connected to said peripheral device and to said second bus;

said write command signal producing means being for producing a write command signal and for delivering said write command signal to said second bus in response to said physical data address signal which is received from said first bus through said input-output processor and said second bus;

said data delivering means being for delivering data from said peripheral device to said second bus;

said input-output processor comprising data and signal delivering means connected to said first and said second buses, said data and signal delivering means being responsive to said write command signal received from said second bus for delivering to said first bus data and said write command signal which are received from said second bus; and data delivered to said first bus being written at said physical data address of said data area in response to said write command signal delivered to said first bus.

3. A data processing system comprising:

a first and a second bus;

an input-output processor connected to said first and said second buses;

a main memory comprising a program area and a data area, said program and said data areas being connected to said first bus, said program area storing a channel program including command and address bits representative of a channel command and of a logical data address;

a peripheral controller comprising memory means connected to said second bus and translation request signal producing means connected to said second bus and to said memory means;

said memory means storing said command and address bits which are received from said program area through said first bus, said input-output processor, and said second bus with said channel command and said logical data address stored as a stored command and a stored data address, said memory means being furthermore for delivering stored data address signals representative of said stored data address to said second bus;

said translation request signal producing means being for producing a translation request signal and for delivering said translation request signal to said second bus when supplied from said memory means with a stored command signal representative of said stored command and moreover when data transfer is indicated by said stored command; and a central processor which comprises translating means connected to said first bus and coupled to said second bus through said input-output processor, said translating means being for translating said stored data address to a physical data address and for delivering a physical data address signal representative of said physical data address to said first bus in response to said translation request and said stored data address signals which are received from said second bus under control of said input-output processor;

said data transfer being carried out between the physical data address of said data area and said peripheral controller through said input-output processor and said first and said second buses in response to said physical data address signal which is delivered to said first bus;

said central processor further comprising start signal generating means coupled to said second bus through said input-output processor and address signal producing means connected to said start signal generating means;

said start signal generating means being for generating a start signal and for delivering said start signal to said input-output processor to make said input-output processor produce said start signal on said second bus;

said address signal producing means being responsive to said start signal for producing a logical program address signal representative of a logical program address corresponding to a physical program address at which said program area stores said command and address bits;

said input-output processor comprising a register coupled to said address signal producing means, said register being for storing said logical program address signal;

said peripheral controller further comprising program request signal producing means connected to said second bus, said program request signal producing means being responsive to the start signal received from said input-output processor through said second bus for producing a program request signal and for delivering said program request signal to said second bus;

said translating means being furthermore coupled to said register and responsive to the program request signal received from said second bus and to the logical program address signal stored in said register for translating said logical program address to said physical program address and for delivering a physical program address signal representative of said physical program address to said first bus;

said central processor further comprising accessing means connected to said first bus and to said program area, said accessing means being for accessing the physical program address of said program area to deliver said command and address bits to said first bus; and said input-output processor further comprising program transferring means connected to said first and second buses, said program transferring means being for transferring to said second bus said command and address bits which are received from said first bus.

* * * * *